No. 661,164. Patented Nov. 6, 1900.
A. R. ANTHONY & C. T. CUNNIUS.
BACK PEDALING BRAKE.
(Application filed Jan. 10, 1899.)
(No Model.) 3 Sheets—Sheet 1.
*Fig. 1.*
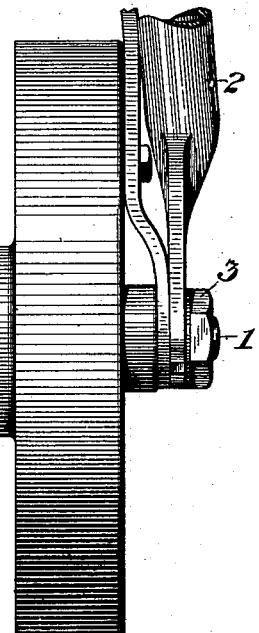
*Fig. 8.*
*Fig. 7.* *Fig. 6.*
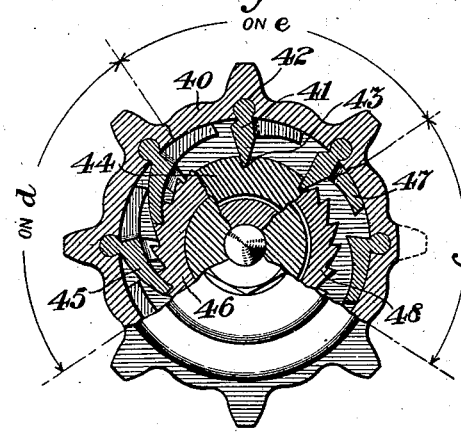
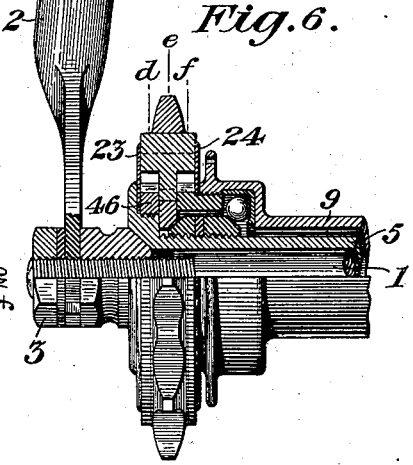
WITNESSES
O. W. Smith
W. E. Neff
INVENTORS
A. R. Anthony
C. T. Cunnius
by Watson & Watson
att'ys No. 661,164. Patented Nov. 6, 1900.
A. R. ANTHONY & C. T. CUNNIUS.
BACK PEDALING BRAKE.
(Application filed Jan. 10, 1899.)
(No Model.) 3 Sheets—Sheet 2.
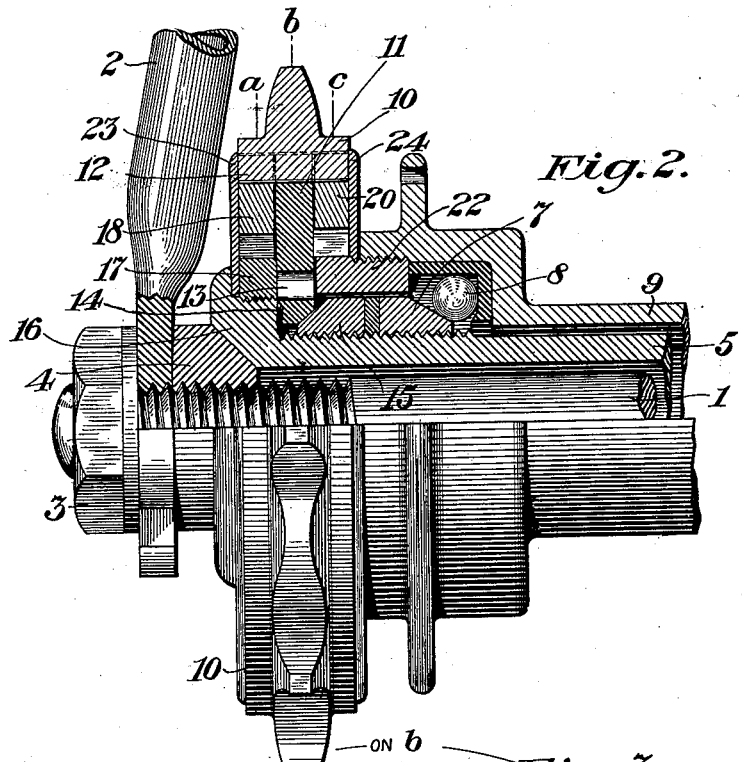
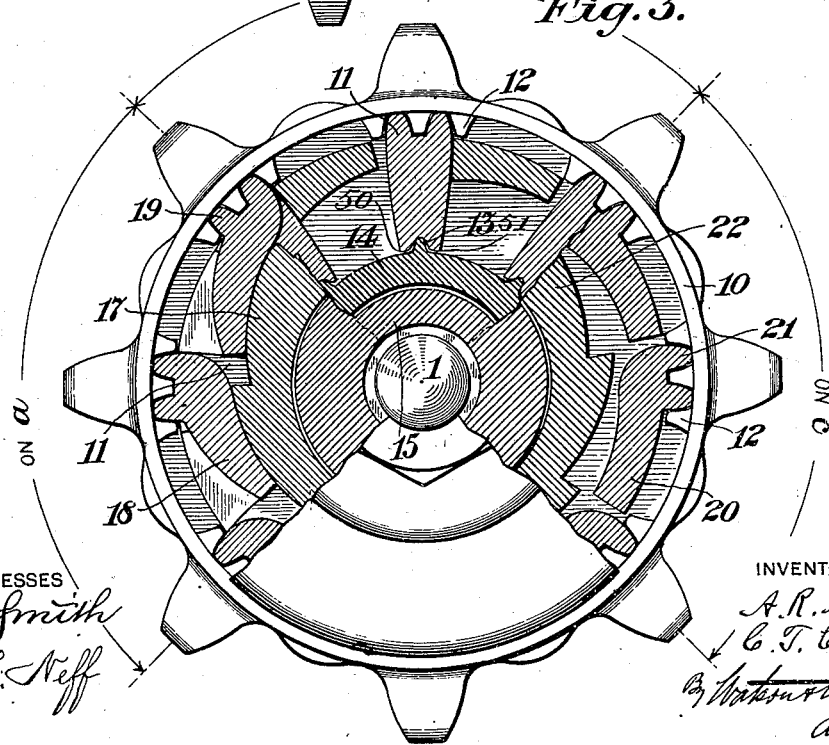
WITNESSES
O. W. Smith
H. E. Neff
INVENTORS
A. R. Anthony
C. T. Cunnius
By Watson & Watson
Attys No. 661,164. Patented Nov. 6, 1900.
A. R. ANTHONY & C. T. CUNNIUS.
BACK PEDALING BRAKE.
(Application filed Jan. 10, 1899.)
(No Model.) 3 Sheets—Sheet 3.
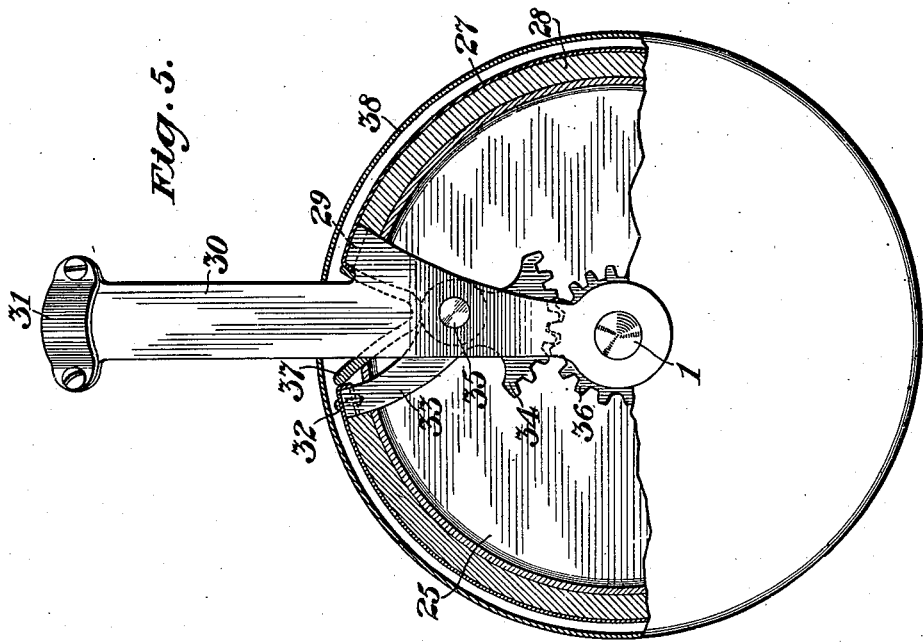
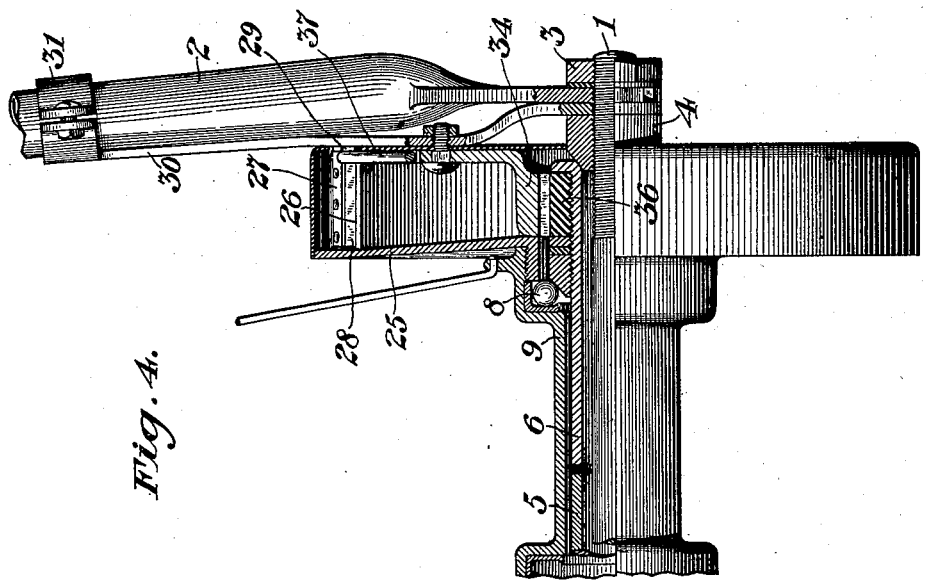
Witnesses
Inventors
A. R. Anthony
C. T. Cunnius
by Watson & Watson Attorneys

UNITED STATES PATENT OFFICE.

ALFRED ROWAN ANTHONY AND CALVIN T. CUNNIUS, OF WILKES-BARRÉ, PENNSYLVANIA.

BACK-PEDALING BRAKE.

SPECIFICATION forming part of Letters Patent No. 661,164, dated November 6, 1900.

Application filed January 10, 1899. Serial No. 701,736. (No model.)

*To all whom it may concern:*

Be it known that we, ALFRED ROWAN ANTHONY and CALVIN T. CUNNIUS, citizens of the United States, residing at Wilkes-Barré, in the county of Luzerne and State of Pennsylvania, have invented certain new and useful Improvements in Automatic Bicycle-Brakes, of which the following is a specification.

Our invention relates to improvements in that class of automatic bicycle-brakes commonly known as "back-pedaling" brakes; and it consists, especially, in a brake of the class described applied to the rear hub of a bicycle and in which the clutching actions are positive and therefore always reliable.

The invention consists, further, in various details of construction and arrangement, all of which will be set forth in the following specification, reference being had to the accompanying drawings, in which—

Figure 1 is a side view of the rear hub of a bicycle, part being broken away to show the internal construction. Fig. 2 is an enlarged view, partly in section, of the left end of the hub. Fig. 3 is an end view of the sprocket-wheel, partly in elevation and partly on the lines *a b c* of Fig. 2, the sprocket-rim being shown in full lines. Fig. 4 is a view of the right end of the hub, partly in section, to show the brake. Fig. 5 is an end elevation of the same, partly in section. Figs. 6 and 7 are views corresponding to Figs. 2 and 3, illustrating a modification of our invention; and Fig. 8 is a detail of one of the rockers shown in Fig. 6.

Referring to Figs. 1 to 5, inclusive, 1 indicates the rear axle of a bicycle, adjusted in the usual manner to the rear fork 2 by means of nuts 3. Within the fork 2 are bearing-cones 4, and supported on these cones is a cylindrical sleeve 5, which is formed in such a manner that it can be slightly contracted or elongated to provide for adjustment of the wheel-bearings, as hereinafter described. As shown in Figs. 1 and 4, this extensible sleeve is constructed in two independent parts having interlocking tongues 6, which permit the two parts of the sleeve to be adjusted longitudinally with reference to each other, but compel them to rotate as one part.

Connected to the sleeve 5 and adjustable therewith are cones 7, upon which run the ball-bearings 8, which support the wheel-hub 9 in the usual manner. The adjustment of the cones 7 is effected by means of the nuts 3 and cones 4, which serve to adjust the extensible sleeve 5, upon which the cones 7 are carried. The sprocket-rim 10, hereinafter called the "driving-rim," is supported by a series of rockers 11, the outer ends of which interlock with teeth 12 upon the inner face of the driving-rim and the inner ends of which interlock with projections 13 upon the hub 14, the said hub being in the form of a ring which is free to rotate between the cone-bearing 15 and the shoulder 16 on the end of the sleeve 5. The rockers 11 permit the rim to rotate slightly back and forth relatively to the hub 14 for a purpose to be presently described.

Upon the left end of the sleeve 5 is rigidly connected a ratchet-wheel 17, and coöperating with this ratchet-wheel are a series of dogs 18, which have teeth 19 engaging the inner teeth 12 of the driving-rim, the engagement being such that the dogs are carried around by the rim in whichever direction it may be rotated. When the rim is rotated forward, the dogs ride over the ratchet-teeth freely or are thrown out by centrifugal force, so as to pass without touching said teeth; but when the driving-rim is turned backward the dogs at once engage the ratchet-wheel, and thus rotate the sleeve 5 backward along with the driving-rim for the purpose of putting on the brake, as will be explained hereinafter.

To the right of the rockers 11 is a second series of dogs 20 exactly like the dogs 18 and having teeth 21, which engage the teeth 12 on the inner face of the driving-rim. The inner ends of these dogs engage a ratchet-wheel 22 when the driving-rim is driven forward, and thereby rotate the hub 9 and the rear wheel of the bicycle, the ratchet-wheel 22 being rigidly connected with the hub 9. The driving-rim is guided, and the dogs and their parts are inclosed by circular plates 23 24, the former being clamped to the extensible sleeve and the latter to the wheel-hub, as clearly shown in Fig. 2.

As shown in Figs. 4 and 5, the disk 25 is rigidly carried by the hub 9 of the rear wheel, and upon said disk is a braking-surface in the form of a ring or flange 26. Surrounding this flange or ring is a brake-band 27, preferably provided with a wearing-surface 28, of leather or other suitable material. One end of the brake-band is rigidly connected at 29 to a fixed bracket 30, the latter being connected at one end to the axle 1 and at the other end to the rear fork 2 by means of a clamp 31. The free end 32 of the brake-band is connected to an arm 33, carried by a segment-gear 34, which is pivoted to a stud 35 upon the bracket 30. The segment-gear meshes with a similar segment-gear 36, which is rigidly connected with the extensible sleeve 5. When said sleeve is moved in one direction, the gears 34 36 draw the brake-band tightly upon the braking-surface 26, and when the extensible sleeve is released the brake-band is thrown off of the braking-surface by means of a spring 37. (See Fig. 5.)

From the foregoing description the operation of our brake will probably be apparent. It permits of coasting with the pedals stationary, and the brake is applied by a slight backward movement of the pedals, while the forward movement of the pedals drives the bicycle in the ordinary manner. Thus when the pedals are moved forward the dogs 20 engage the ratchet-wheel 22, which is fast upon the wheel-hub, and thus drive the rear wheel. The dogs 18 at the same time ride freely over the ratchet-wheel 17, which remains stationary. When the pedals are stopped, the rear wheel is free to run forward, the dogs 20 riding idly over the ratchet-wheel 22 and the dogs 18 and ratchet-wheel 17 remaining stationary. When it is desired to put on the brake, the pedals are pressed backward. The driving-rim 10 is thus turned backward, and the dogs 18 turn the ratchet-wheel 17 and the sleeve 5 backward. The rearward movement of the sleeve turns the gears 34 and 36, Fig. 5, and applies the brake, the force with which the brake is applied depending upon the amount of backward pressure exerted upon the pedals. The brake-band is incased in a box or casing 38 to keep out dust and oil. The bearings may be readily adjusted, as heretofore explained. When the driving-rim is driven forward, the rockers 11 tip slightly on the pivotal points 13, just sufficient to permit the pawls 20 to engage the ratchet-wheel 22. The lower projections 51 on the forward side of the rockers engage the ring 14, and the driving-rim, rockers, and ring are carried forward together as if they were rigidly connected. When the driving-rim is turned backward, it carries the rockers backward slightly until the pawls 18 engage the ratchet-wheel 17. At this time the lower rear corners 50 of the rockers impinge upon the ring 14 and the ring, rockers, and driving-rim again become rigidly connected together and move as though constructed of a single piece. In moving the parts either backward or forward the power is applied to the driving-rim and transmitted next to the rockers and lastly to the ring. The ring is intended to run freely on its bearing, but without looseness thereon. The teeth on the outer end of the rockers and on the inner face of the driving-rim resemble ordinary gear-teeth, and there is sufficient looseness to permit the rockers to move slightly, as above described. The angular movement of the rockers is of course very slight, which will be apparent from an inspection of the drawings.

In Figs. 6, 7, and 8 we have illustrated a modified form of rear driving-wheel which operates in a manner quite similar to the one above described. In these figures the rim 40 is supported upon rockers, each of which consists in a middle portion 41, extending between a socket 42 in the rim and a notch or socket 43 in the hub-ring 44. Each of the rockers has an integral dog 45, adapted to engage a ratchet-wheel 46, which is connected to the sleeve 5, and an integral dog 47, adapted to engage the ratchet-wheel 48, which is connected to the rear hub. The remaining parts (shown in Figs. 6 and 7) are exactly the same as those shown in Figs. 2 and 3 and heretofore described. The operation of this form of the invention is substantially the same as the operation of the previous form, with the exception that when the driving-rim is positively moved backward the dogs 45 are positively drawn into engagement with the ratchet-wheel 46, and when the rim is moved forward the dogs 47 are positively moved into engagement with the ratchet-wheel 48, the rockers being free to move sufficiently to engage and disengage the dogs, as described.

It will be evident that either of the forms shown in Figs. 2 and 6 may be used with the brake shown in Figs. 4 and 5 or with any other suitable form of brake. Our invention is therefore not limited to the particular form of brake mechanism illustrated, although such has been found by us to be very effective. In outward appearance the driving-wheel selected for illustrating our invention differs but slightly from the usual single-piece sprocket, as will be apparent from an inspection of Fig. 1. It affords, however, a positive and reliable means for operating a bicycle-brake, and in this respect is much superior to driving devices operated in connection with ball or friction clutches, which are liable to slide and are often rendered useless by the accidental admission of oil to their engaging surfaces.

What we claim, and desire to secure by Letters Patent, is—

1. In an automatic bicycle-brake, the combination of a driving-rim, the rear axle, an extensible sleeve surrounding said axle, said sleeve being rotatable but normally stationary, bearings upon said sleeve, the rear wheel-hub mounted on said bearings and free to revolve thereon while the sleeve is stationary, a brake device connected to one end of said sleeve, and means for connecting and disconnecting the driving-rim with the other end of said sleeve for the purpose of applying and releasing the brake.

2. In a back-pedaling brake the combination with an axle of a sleeve arranged to rotate about the axle, a wheel-hub arranged to rotate upon said sleeve, a ratchet-wheel connected to said sleeve, a second ratchet-wheel connected to said wheel-hub, a driving-rim surrounding said ratchet-wheels, dogs connected with the driving-rim and arranged to engage and rotate the ratchet-wheels, and a brake device also connected to said sleeve, substantially as described.

3. In a back-pedaling brake, the combination of an axle, a rotatable sleeve surrounding the axle, a rotatable hub surrounding the sleeve, a driving-rim, two ratchet-wheels within said rim connected respectively to said sleeve and hub, two series of dogs within said rim, one series for each ratchet-wheel, said dogs being in permanent engagement with the driving-rim and adapted to drive the ratchet-wheels in opposite directions corresponding to the backward and forward movements of the driving-rim, and a brake device connected to said sleeve, substantially as described.

4. In a back-pedaling brake, in combination with the brake device, the combined driving-wheel and clutch comprising a driving-rim, a series of rockers upon which said rim is supported, a ring supporting the inner ends of the rockers, a ratchet-wheel on one side of said rockers connected with the rear hub, a ratchet-wheel on the opposite side of said rockers connected with the brake device, and a series of dogs for each ratchet-wheel movably connected with the driving-rim, substantially as described.

5. In a back-pedaling brake, the combination with a driving-rim of a series of rockers supporting said rim, a ring upon which said rockers are supported, ratchet-wheels on opposite sides of said rockers and within the driving-rim, dogs on opposite sides of said rockers adapted to connect the driving-rim with the ratchet-wheels, and disks inclosing said ratchet-wheels, dogs and rockers, the ratchet-wheels being connected respectively to the driving-wheel of the bicycle and to the brake, substantially as described.

6. In an automatic bicycle-brake, the combination with an axle of an extensible sleeve rotatably mounted on the axle, bearings carried by the parts of said sleeve, a wheel-hub carried on said bearings, said hub being free to revolve thereon while the sleeve is normally stationary, and means for adjusting the length of the sleeve, whereby the bearings of said wheel-hub are adjustable, substantially as described.

7. In an automatic bicycle-brake, the combination with an axle of an extensible sleeve rotatably mounted on the axle, and comprising two halves having interlocking portions whereby they are adjustable longitudinally but compelled to rotate together, cones mounted upon the parts of said sleeve, a wheel-hub having ball-bearings running on said cones, said hub being free to revolve while the sleeve is normally stationary, and means for adjusting the two parts of the extensible sleeve, whereby the cone-bearings of the hub are adjusted, substantially as described.

8. In a back-pedaling brake, the combination with an axle of an extensible sleeve rotatably mounted on the axle, a wheel-hub rotatably mounted on said sleeve, ratchet-wheels connected to said wheel-hub and sleeve, respectively, a driving-rim, dogs connected with the driving-rim and adapted to move said ratchet-wheels in opposite directions, a brake-ring connected with the wheel-hub and a brake-band connected at one end with the extensible sleeve and at the other end to a stationary part and arranged to be applied to the brake-surface when the sleeve is rotated backward, substantially as described.

9. In a combined coaster and brake for velocipedes, the combination with the wheel-hub, a driving-wheel mounted loosely on one end thereof, and a coasting-clutch which is interposed between the driving-wheel and the hub and which drives the latter forwardly but allows said wheel to be held stationary while the hub continues its forward rotation, of a brake mounted on a stationary support at the opposite end of the hub, a brake-actuating device, a sleeve connected at one end with said actuating device and arranged lengthwise in the hub but independent thereof, said sleeve being normally stationary and free to be turned backwardly while the hub is free to rotate forwardly, and a brake-clutch interposed between the opposite end of the sleeve and the driving-wheel and operating reversely to the coasting-clutch, substantially as set forth.

In testimony whereof we affix our signatures in presence of two witnesses.

ALFRED ROWAN ANTHONY.
CALVIN T. CUNNIUS.

Witnesses:
R. LAURA CANNON,
LEONARD MACHELL.